United States Patent
Yuba et al.

(10) Patent No.: US 7,998,544 B2
(45) Date of Patent: Aug. 16, 2011

(54) DECORATIVE CASING AND MANUFACTURING METHOD THEREOF

(75) Inventors: Takashi Yuba, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 90 days.

(21) Appl. No.: 12/068,975

(22) Filed: Feb. 13, 2008

(65) Prior Publication Data

US 2008/0317980 A1  Dec. 25, 2008

(30) Foreign Application Priority Data

Jun. 19, 2007 (JP) ................................ 2007-161608

(51) Int. Cl.
*B44F 1/00* (2006.01)
*B32B 38/06* (2006.01)
(52) U.S. Cl. ........... 428/29; 428/220; 156/196; 156/221
(58) Field of Classification Search ............... 428/29, 428/212; 156/196, 221
See application file for complete search history.

(56) References Cited

U.S. PATENT DOCUMENTS

| | | | |
|---|---|---|---|
| 2005/0260386 A1* | 11/2005 | Heinrich et al. | 428/141 |
| 2007/0144700 A1* | 6/2007 | Kobayashi et al. | 164/14 |
| 2009/0147363 A1* | 6/2009 | Murata et al. | 359/576 |

FOREIGN PATENT DOCUMENTS

| | | | | |
|---|---|---|---|---|
| EP | 1688248 A1 | * | 8/2006 | |
| JP | 2005-219394 | | 8/2005 | |
| JP | 2005219394 A | * | 8/2005 | |
| WO | WO 2005092588 A1 | * | 10/2005 | |
| WO | WO 2007145120 A1 | * | 12/2007 | |

OTHER PUBLICATIONS

Machine_English_Translation_JP_2005219394_A, Fujisawa, Koji, Decorative Material, Aug. 18, 2005, JPO, whole document.*

* cited by examiner

*Primary Examiner* — David R Sample
*Assistant Examiner* — Tahseen Khan
(74) *Attorney, Agent, or Firm* — Staas & Halsey LLP

(57) ABSTRACT

A decorative casing including a base material having a surface that includes at least one uneven region and a multilayer film having a plurality of thin films laminated together alternately of different refractive indexes from each other, which is adhered to the surface of the base material. The multilayer film includes at least one first region and at least one second region, wherein each thin film of said multilayer film in the first region has only smooth surfaces and one or more of the plurality of thin films of said multilayer film in the second region have uneven surfaces that each correspond positionally to the at least one uneven region of the surface of the base material. The multilayer film generates interference color in the first region.

10 Claims, 20 Drawing Sheets

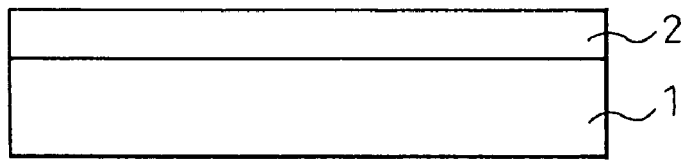
FIG.11A
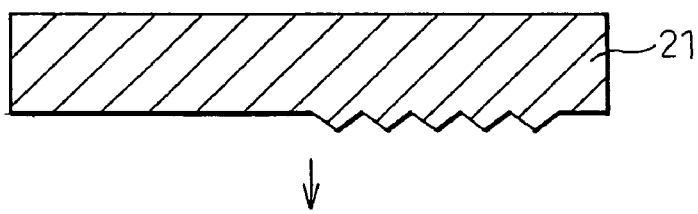
FIG.11B
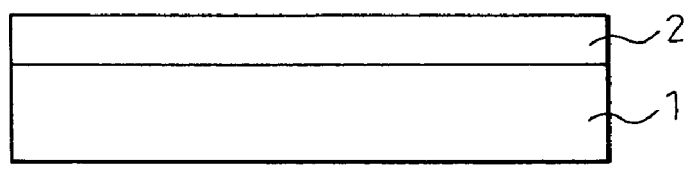
FIG.11C
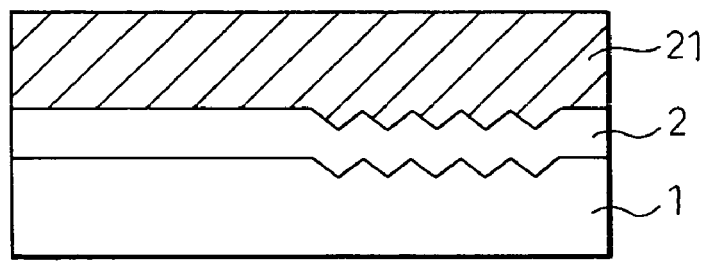
FIG.11D
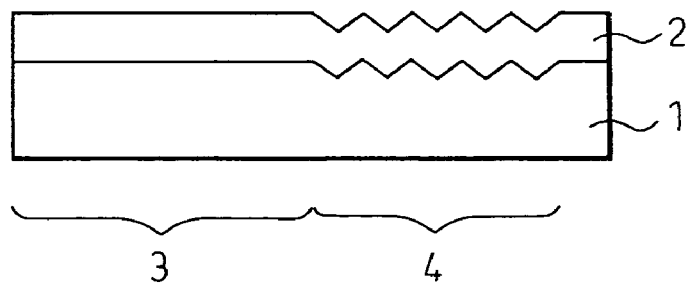

DECORATIVE CASING AND MANUFACTURING METHOD THEREOF

BACKGROUND OF THE INVENTION

1. Field of the Invention

The present invention relates to a decorative casing of an electronic device or the like, and specifically relates to a decorative casing using a multilayer film generating interference colors of which color tones change depending on a viewing angle of the decorative casing.

2. Description of the Related Art

As a factor that determines a salability of an electronic device or the like, obviously importance is attached to the actual function of the electronic device. However, the appearance of the product is also an important element. At present, functions of products in certain product groups have become similar, so it is difficult to differentiate the functions of the products. Consumers usually prefer a decorative product among many products which have substantially the same functions; however the appearance of the products is likely to have a greater influence on the sales of the products.

Based on the miniaturization of electronic devices in recent years, portable products are becoming more widespread, as represented by portable telephones and portable music players, compared with products used in a fixed state. As a result, users of portable products consider them to be accessories, and place importance on decoration, such as color, as well as shape and appearance. Therefore, manufacturers are differentiating their products from competitors' products through appearance. In addition to products that are always used in a mobile state, in products such as a mouse and a memory card of a personal computer, the outward appearance along with, surface decoration of the product is important to differentiate the product from those of competitors. Accordingly, manufacturers are actively studying techniques to enhance decoration of products.

One technique of applying decoration to a product is a decorative technique by which colors of the product appear different from different angles. This technique uses changing colors to give color depth. Various methods for achieving this kind of decoration are in use.

First, there is a method of coloring a casing of a product itself using a colored resin. However, it is difficult to obtain an impression of high quality from this method. Further, because a color of the surface does not change even if the surface shape is changed, the color of the surface becomes simple.

Second, there is a method of coating a casing of a product. However, a coating material which changes the color according to the viewing angle of the product is expensive, and this coating material gives an impression of low quality.

Third, there is a method of coating with a metal film and a dielectric film. However, the addition of a coating process increases tact time, which results in a decrease in productivity of the product.

Fourth, there is a method of attaching a seal to a casing. However, according to this method, a surface of the product is hidden under the seal, which results in the surface shape of the seal becoming flat, even when stereoscopic modeling is performed on the surface of the product under the seal.

Consequently, there is proposed a method of using a multilayer film utilizing interference colors of light. The multilayer film has a lamination of two or more layers having different refractive indexes which exhibits colors using interferential effect of light due to an optical path difference. The principle of coloring will be explained with reference to FIG. 1. When a multilayer film 101, having plural films of a thin film A and a thin film B are alternately laminated, and provided on a base material 100, light 102 incident to the multilayer film 101 is reflected at the interface between thin films A and B, and the reflected light interferes with each other. Following expression is established:

$(n_A d_A \cos \theta_A + n_B d_B \cos \theta_B) = m\lambda$ (where m is an integer), where film thicknesses of the thin films A and B are expressed as $d_A$ and $d_B$, light incident angles are expressed as $\theta_A$ and $\theta_B$, refractive indexes are expressed as $n_A$ and $n_B$, and a wavelength is expressed as $\lambda$.

$(n_A d_A \cos \theta_A + n_B d_B \cos \theta_B) = m\lambda$ (where m is an integer). In this case, the lights of wavelength $\lambda$ interfere with each other to increase the strength of the light. When an observer changes a viewing angle of the base material adhered with the multilayer film, incident angle $\theta$ of a reflected light reaching the observer relative to the multilayer film changes. Accordingly, wavelength $\lambda$ of the interfering light changes. As a result, the coloring of the interference colors change. Therefore, when the multilayer film exhibiting interference colors is applied to a product, coloring that changes at different angles of viewing the product can be achieved, thereby providing decoration to the product.

Japanese Patent Application Laid-open No. 2005-219394 (Patent Document 1) discloses a decoration technique using a multilayer film exhibiting the interference colors. FIGS. 2A and 2B depict cross-sectional views of a decorative material described in above Patent Document 1. A multilayer film 201 is formed as a light-interference multilayer film, by laminating synthetic-resin thin films via adhesive layers. Synthetic resin films 202a and 202b for shape stabilization are laminated on multilayer film 201, to stereoscopically form a material film 203. Material film 203 is used as a decorative material 205. When multilayer film 201 is stereoscopically formed, the film is distorted, and is not totally uniform. As a result, a wavelength region for transmitting or reflecting the light at each part of decoration material 205 changes. Consequently, a rainbow-like pattern appears, or the pattern becomes substantially transparent due to the emphasis or reflection of a certain wavelength region, and various optical changes appear.

According to this conventional technique, coloring can be changed on curved parts, using a stereoscopic shape. However, it has been difficult to generate a change of color tone to a desired shape at a desired position. On a flat part, coloring is substantially uniform, because an angle formed between the flat surface and the observer becomes substantially constant. As a result, when this technique is applied to a product having many flat regions, the color tone becomes simple.

SUMMARY OF THE INVENTION

A decorative casing according to the present invention has a multilayer film, having plural thin films of different refractive indexes laminated together, adhered to the surface of a base material. At least a part of the surface of the multilayer film is formed uneven.

In the above decorative casing, the surface of the multilayer film may include an uneven surface region, and a smooth surface region.

The decorative casing according to the present invention may have an adhesive layer between the multilayer film and the surface of the decorative casing. The adhesive layer preferably may include a polyester resin. The decorative casing may also have a colored layer between the multilayer film and the surface of the base material.

The thickness of the multilayer film is preferably 13 to 19 microns.

Preferably, the base material is made of resin, and more preferably, the resin is a thermoplastic resin. A part of an electronic device can be configured using the decorative casing, and a part of a portable telephone can be configured using the decorative casing.

A method of manufacturing a decorative casing according to the present invention is a manufacturing method of a decorative casing having a multilayer film on the surface, including a step of embossing the surface of the base material of the decorative casing to form an uneven surface and a step of gluing a multilayer film to the surface of the base material including the uneven surface.

The manufacturing method may also include a method of manufacturing a decorative casing having a multilayer film on the surface, including a step of gluing the multilayer film to the surface of the base material of the decorative casing, and a step of embossing the base material to form an uneven surface over the multilayer film. The asperity of the material for embossing may be formed by nanoimprint.

The manufacturing method may also include a method of manufacturing a decorative casing having a multilayer film on the surface, including a step of uneven irradiating a laser beam onto the surface of the base material of the decorative casing to form an uneven surface on the surface of the base material, and a step of gluing a multilayer film to the surface of the base material including the uneven surface.

The manufacturing method may also include a method of manufacturing a decorative casing having a multilayer film on the surface, including a step of cutting a surplus part of the adhered multilayer film, by the Victoria die.

The manufacturing method may also include a method of manufacturing a decorative casing having a multilayer film on the surface, including a step of providing the multilayer film within a recess of a mold formed with an asperity on the inner surface of the recess, a step of injecting a thermoplastic resin that becomes a base material of the decorative casing, via the multilayer film within the recess of the mold, a step of cooling the base material, and a step of extracting the base material adhered with the multilayer film from the recess of the mold.

The manufacturing method may also include a method of manufacturing a decorative casing having a multilayer film on the surface, including a step of coating a resin liquid, having an adhesive agent solved in an organic solvent, onto a multilayer film, a step of removing the organic solvent by heating the multilayer film coated with the resin liquid, and forming an adhesive layer, and a step of having the multilayer film adhered to the surface of the base material of the decorative casing formed with unevenness, via the adhesive layer.

In the above coating step, the coating is preferably performed by a bar coater or a die coater. Before the coating step, corona treatment or flame treatment is preferably performed on the surface of the multilayer film. The manufacturing method may further include a step of adding polyisocyanate or an additive for plastics to the organic solvent.

The manufacturing method may also include a method of manufacturing a decorative casing having a multilayer film on the surface, including a step of forming a colored layer on one surface of the multilayer film, and a step of gluing the multilayer film to the surface of the base material of the decorative casing formed with unevenness, via the colored layer. The manufacturing method may further include a step of forming an adhesive layer on the surface of the multilayer film on which the colored layer is formed.

The manufacturing method may also include a method of manufacturing a decorative casing having a multilayer film on the surface, including a step of forming a colored layer on the surface of a base material of the decorative casing formed with unevenness, a step of forming an adhesive layer on the surface of the multilayer film, and a step of gluing the multilayer film to the surface of the base material formed with the colored layer, via the adhesive layer.

According to the present invention, a change of color tone can be generated in a desired region of a decorative casing using a multilayer film exhibiting interference colors, and decoration of the decorative casing can be improved easily and simply.

BRIEF DESCRIPTION OF THE DRAWINGS

These and other features and advantages of the present invention will be better understood by the following detailed description, taken together with the drawings wherein:

FIGS. 11A to 11D are process schematic views of a method of manufacturing a decorative casing according to a ninth embodiment;

DESCRIPTION OF THE PREFERRED EMBODIMENTS

The decorative casings according to the embodiments of the present invention will be hereafter described. A first embodiment is a basic embodiment of a decorative casing according to the present invention, and a second embodiment to the seventh embodiment are other modifications of the decorative casing according to the present invention. The eighth embodiment to the eighteenth embodiment are examples concerning a method of manufacturing a decorative casing according to the present invention, and the nineteenth embodiment to a twenty-first embodiment are examples of the application of the decorative casing according to the present invention to an electronic device and the like.

First Embodiment

Figure 3A:
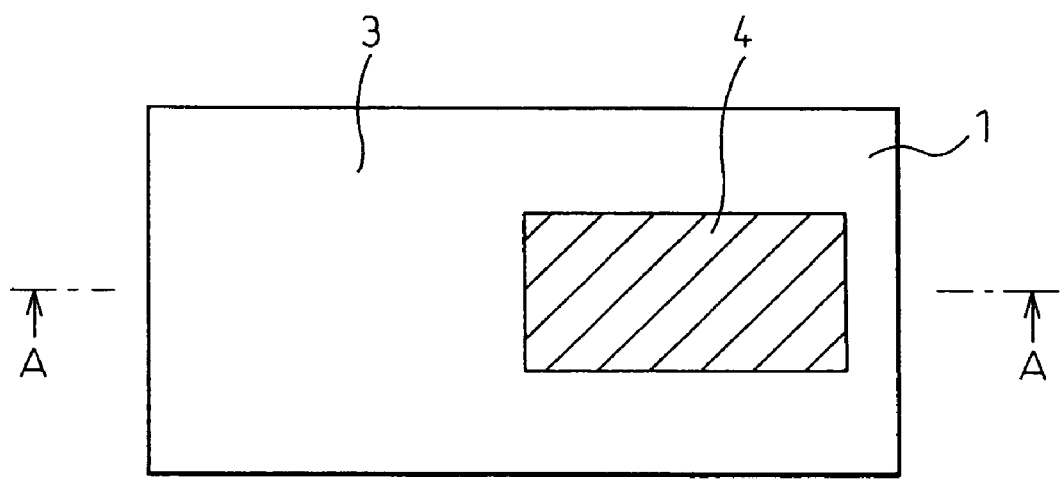
FIGS. 3A and 3B are a top plan view and a cross-sectional view of a decorative casing according to a first embodiment.
Figure 3B:
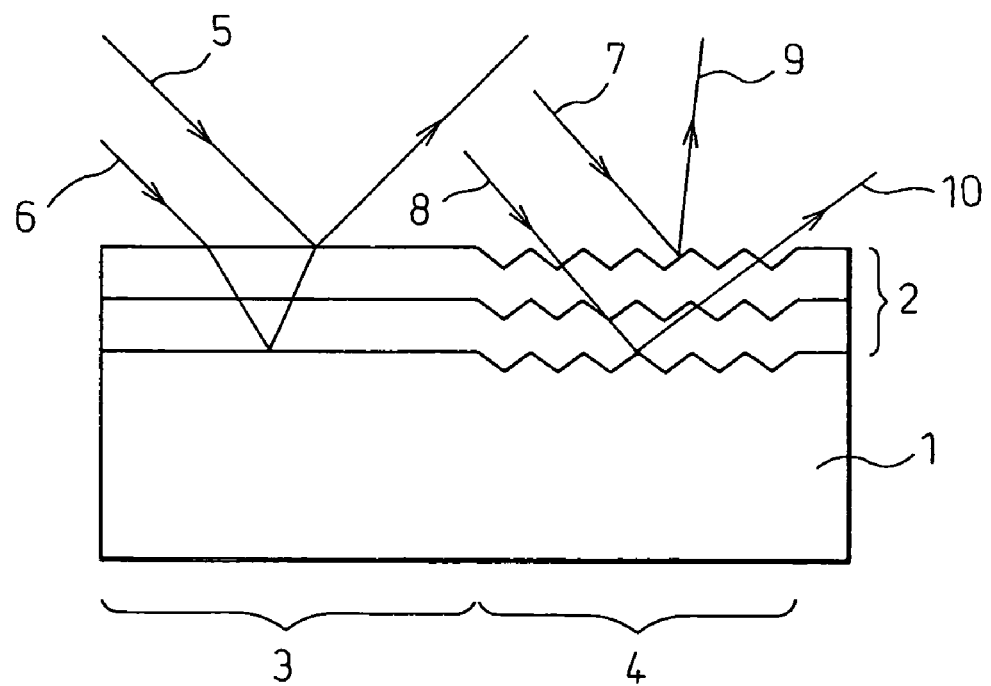

The first embodiment as a basic embodiment of the present invention will be described with reference to FIGS. 3A and 3B. FIG.3A is a schematic top plan view of a decorative casing according to the present invention, and FIG. 3B is a schematic cross-sectional view of the decorative casing in FIG. 3A cut along a line A-A. These views are schematically drawn to facilitate the understanding of the content of the present invention, and are not limited to a scale and aspect ratio shown in the drawings.

As shown in FIG. 3B, a multilayer film 2 is formed on the whole surface of a base material 1 made of a thermoplastic resin, for example. A first region 3 having a smooth surface, and a second region 4 formed with an uneven surface are provided on base material 1. The concept of "smooth" is a concept including "flat", and indicates a state that an uneven surface or a rough surface are not formed even when the surface is curved, not only that the surface shape is not a curve (i.e., a flat shape). In other words, "smooth" means a surface shape that does not generate a diffuse reflection.

While FIG. 3B depicts an example of two layers to facilitate the understanding of the content of the present invention, multilayer film 2 can also include three or more layers. This also applies to multilayer films in other drawings described hereinafter.

A structure of base material 1 may be a casing provided with a cavity for incorporating an electronic device or the like, or may be a casing filled with a resin or the like, having no cavity inside the casing. A material of the base material is preferably a resin, and a thermoplastic resin such as acrylonitrile butadiene styrene (ABS), polycarbonate (PC), polymethylmethacrylate (PMMA), and polycarbonate ABS is particularly preferable. The base material may also be a metal that can be formed with an uneven surface, and may have a structure having a resin adhered to the surface of the metal.

The multilayer film 2 includes polyethyleneterephthalate (PET), and a film thickness is preferably 13 to 19 micrometers, and most preferably, 19 micrometers. By setting the film thickness at 19 micrometers, there is an effect that interference colors of various color tones are obtained at different angles, thereby achieving improved decoration.

Natural light incident to first region 3 is reflected at multilayer film 2. When the multilayer film 2 has a refractive index and a film thickness satisfying an interference condition, multilayer film 2 generates interference colors. The principle of the generation of the interference colors is as described above. As shown in FIG. 3B, lights 5 and 6 incident to first region 3 appear as colored lights, based on the interferential action of the two lights reflected at the upper surface and the bottom surface of the multilayer film 2.

On the other hand, the second region 4 is provided with uneven surface. This uneven surface includes plural tiny protrusions. Reflected lights 9 and 10 of incident lights 7 and 8 incident to the second region 4 do not generate interference colors depending on angles. Even when the reflected light generate interference colors, the interference colors are different from those generated from first region 3. This is because effective incident angles of light in the first region are different from those in the second region. Therefore, coloring in first region 3 is different from that in second region 4.

When angles formed by the inclined plane of the protrusions in the second region are random, many interference colors are mixed, instead of generating specific interference colors. As a result, second region 4 has a color tone different from that generated in first region 3. Particularly, the interference colors in second region 4 in which the uneven surface is formed have a mixture of various colors. Further, because the interference colors from tiny regions change at different angles, this makes the surface twinkle.

FIG. 3B depicts an example of an uneven surface formed on the surface of multilayer film 2, the inside of multilayer film 2, and the interface between multilayer film 2 and base material 1. However, the uneven surface does not need to be formed on all thin films constituting multilayer film 2. In other words, even when the uneven surface is formed on a part of plural thin films constituting multilayer film 2, it is sufficient if the color tone in second region 4 is different from the color tone of the interference colors in first region 3.

While FIG. 3B depicts an example of a structure of the uneven surface that is concave, the uneven surface may be also convex.

The other embodiments described below have basic structures similar to that of the first embodiment. Therefore, these embodiments are described by focusing on the differences compared to the first embodiment.

Second Embodiment

Figure 4A:
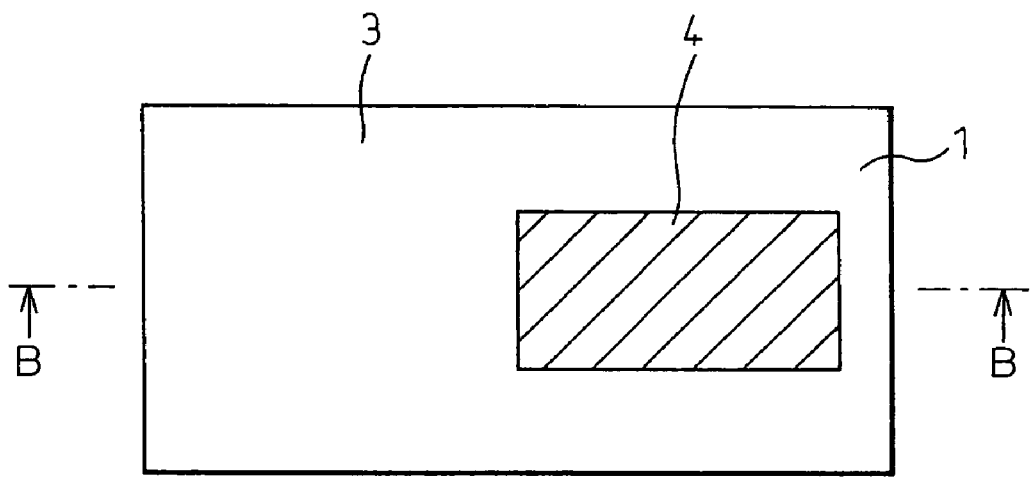
FIGS. 4A and 4B are a top plan view and a cross-sectional view of a decorative casing according to a second embodiment.
Figure 4B:
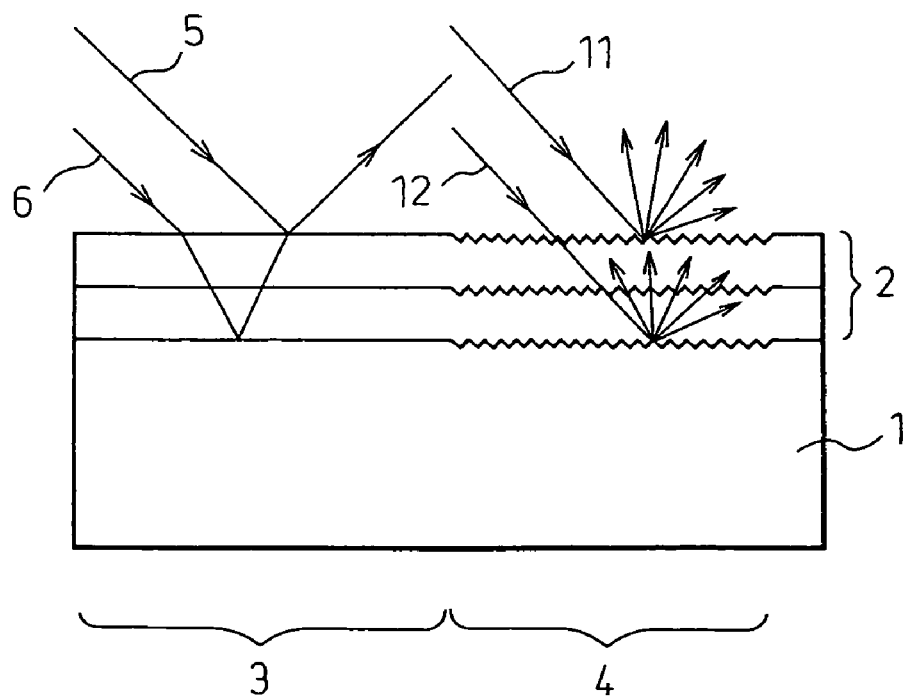

In the second embodiment, a coarse surface is provided as one example of the uneven surface formed in the second region. FIG. 4A is a top plan view of a decorative casing having the base material 1 on which the multilayer film 2 is provided. FIG. 4B is a cross-sectional view of the decorative casing shown in FIG. 4A cut along a line B-B. The first region 3 having a smooth surface and the second region 4 having a coarse surface are formed on the surface of the base material 1.

The "coarse surface" has a very fine pitch and a very fine depth of unevenness. Reflected light from tiny protrusions on the coarse surface are reflected diffusely without interference, and have small angle dependence of color tone as compared with angle dependence of color tone of reflected light from the first region. Therefore, the color tone in the second region 4 can be expressed differently from the color tone in the first region.

In other words, as shown in FIG. 4B, lights 5 and 6 incident to the first region 3 exhibit interference colors. On the other hand, lights 11 and 12 incident to the second region 4 generate diffuse reflections on the surface of the multilayer film 2 and on the surface of the base material 1, without generating interference colors. As a result, the second region 4 presents a color tone of reflected lights different from that generated in the first region 3. As described above, by forming a coarse surface in the second region 4, a color tone different from that generated from relatively large unevenness can be exhibited.

Third Embodiment

Figure 5A:
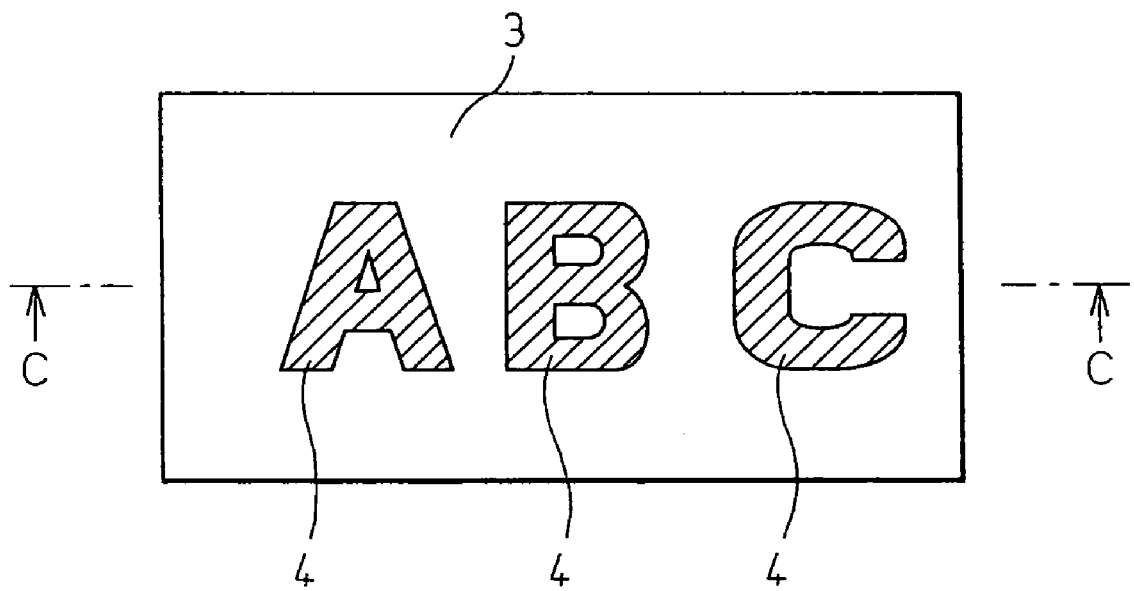
FIGS. 5A and 5B are a top plan view and a cross-sectional view of a decorative casing according to a third embodiment.
Figure 5B:
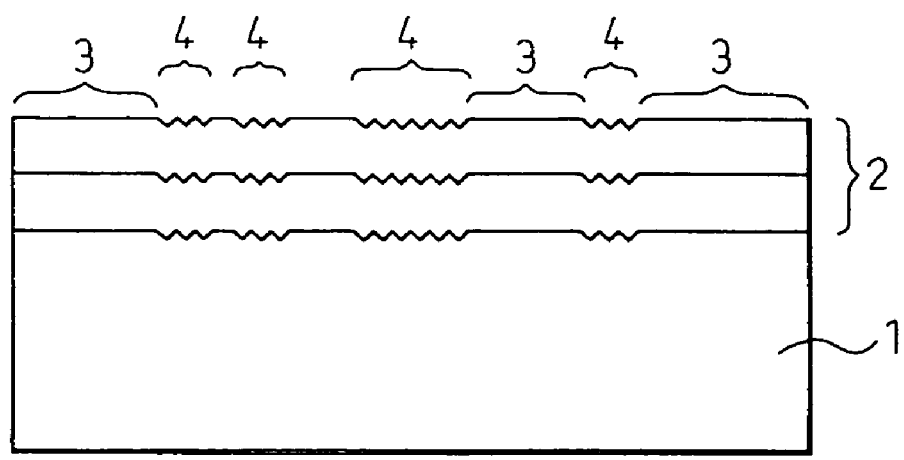

While the second region having a simple shape is presented in the first and the second embodiments, the second region in the third embodiment has characters or symbols unlike the above examples, as shown in FIG. 5A. FIG. 5A is a top plan view of the decorative casing having the base material 1 on which a coarse surface is provided along a shape of characters "ABC". FIG. 5B is a cross-sectional view of the decorative casing shown in FIG. 5A cut along a line C-C. As shown in FIGS. 5A and 5B, fine unevenness is formed on the surface of the base material 1 at a part where the letters "ABC" are expressed, and light incident to the second region 4 is reflected diffusely. On the other hand, regions where characters are not formed become the first region 3 where interference colors are exhibited.

Therefore, the difference between the color tone in first region 3 and the color tone in the second region, and the letter "ABC" can be recognized from the difference of the color tones. Accordingly, in addition to the process of forming the multilayer film, it is not necessary to add a process of printing letters such as a product name or a manufacturer name. As a result, manufacturing cost can be decreased.

Fourth Embodiment

The fourth embodiment is described next. In the fourth embodiment, a colored layer is provided beneath the multilayer film. Generally, a multilayer film itself is transparent. Light incident to this film without interference condition is reflected from the base material by representing the color of the base material itself. To obtain a desired color tone from this reflected light, a colored layer 13 is provided between the multilayer film 2 and the base material 1, as shown in FIGS. 6A and 6B.

Figure 6A:
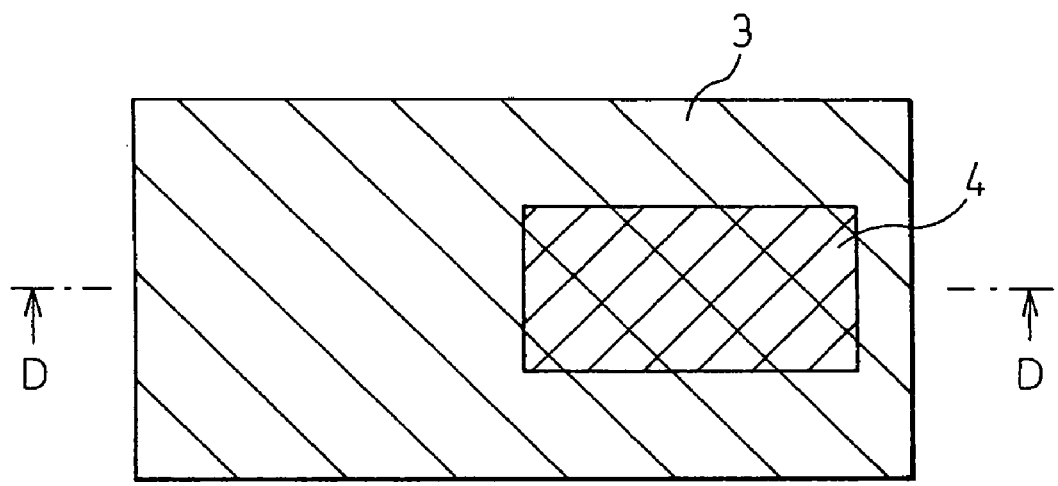
FIGS. 6A and 6B are a top plan view and a cross-sectional view of a decorative casing according to a fourth embodiment.
Figure 6B:
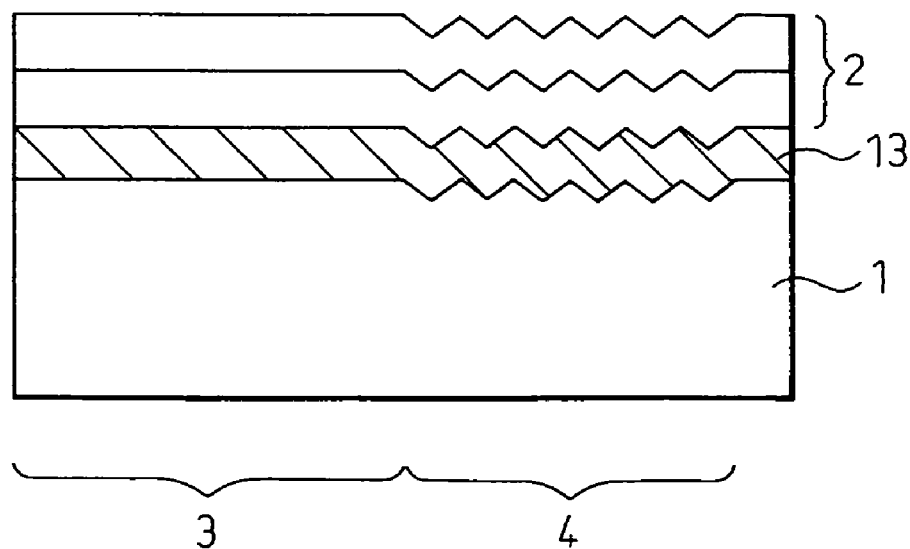

FIG. 6A is a top plan view of the decorative casing having the base material 1 on which the first region 3 of a smooth surface and the second region 4 of an uneven surface are provided. FIG. 6B is a cross-sectional view of the decorative casing shown in FIG. 6A cut along a line D-D. As shown in FIG. 6B, the colored layer 13 is provided between the base material 1 and the multilayer film 2. Because the multilayer film 2 is basically transparent, reflected light from the first region 3 exhibits a color tone having the color of the colored layer and the interference colors of the multilayer film 2 superimposed with each other. On the other hand, in the second region 4, the light reflected diffusely by the uneven surface and the reflected light from the colored layer 13 are superimposed on each other, thereby exhibiting a color tone different from that in the first region 3.

Based on the above configuration, the interference colors and the color of the colored layer can be combined together, thereby making it possible to provide various color tones. The colored layer can be provided on the whole surface of the base material, or can be provided in only a part of the surface of the base material. The color of the colored layer can be a plain simple color, or can be a combination of colors, or can be changed in each region. In this way, various color tones can be obtained based on various combinations.

Fifth Embodiment

In the fifth embodiment, a part of the decorative casing is curved, and an uneven surface for generating a diffuse reflection is provided in the curved part.

Figure 7A:
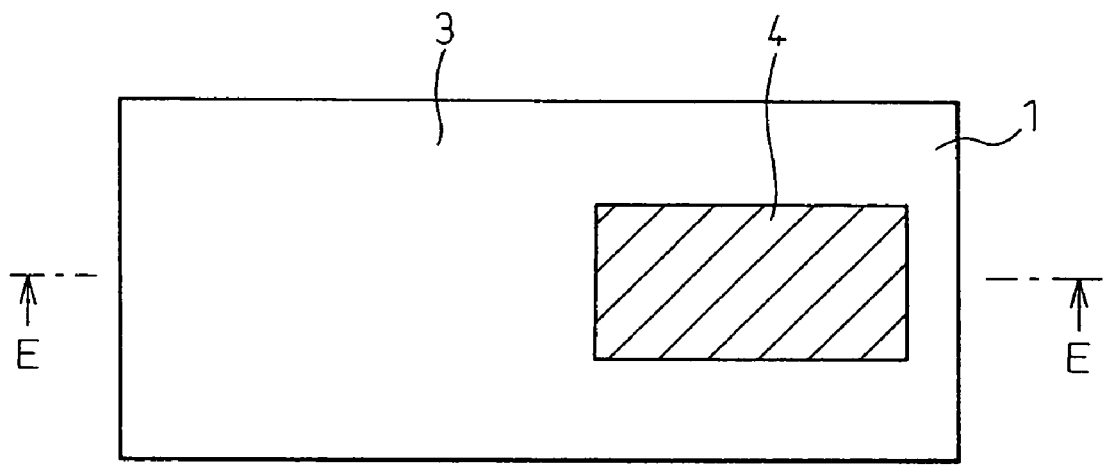
FIGS. 7A and 7B are a top plan view and a cross-sectional view of a decorative casing according to a fifth embodiment.
Figure 7B:
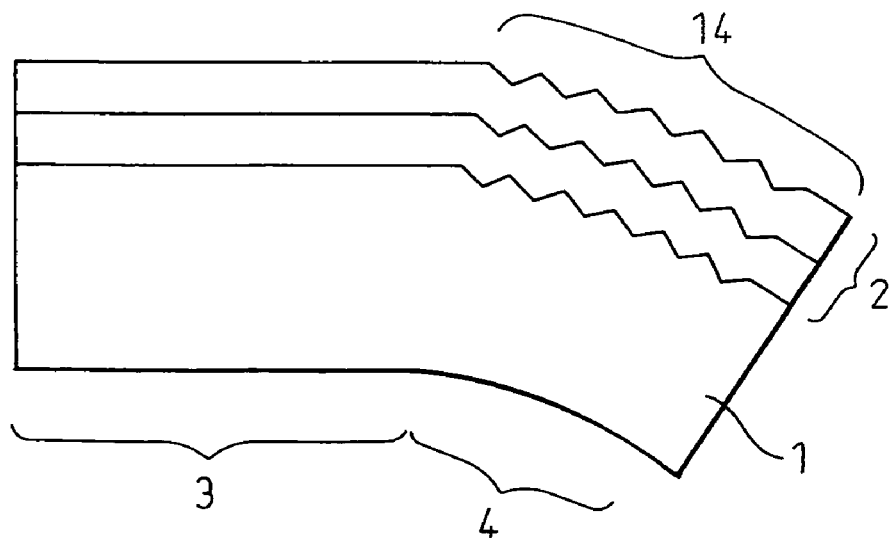

FIG. 7A is a top plan view of the decorative casing having the base material 1 on which the first region 3 of a smooth surface and the second region 4 of an uneven surface are provided. FIG. 7B is a cross-sectional view of the decorative casing shown in FIG. 7A cut along a line E-E. As shown in FIG. 7B, a curved part 14 is provided at a part of the base material 1. In the present embodiment, an uneven surface is provided within the curved part 14 to form the second region 4. In the curved part 14, an effective incident angle of light in the base material 1 changes along the curved surface. Therefore, more complex color tone can be achieved. The curved part can be provided in only the first region 3 or in both the first region 3 and the second region 4.

Sixth Embodiment

In the sixth embodiment, an adhesive layer is provided between the multilayer film and the base material.

Figure 8A:
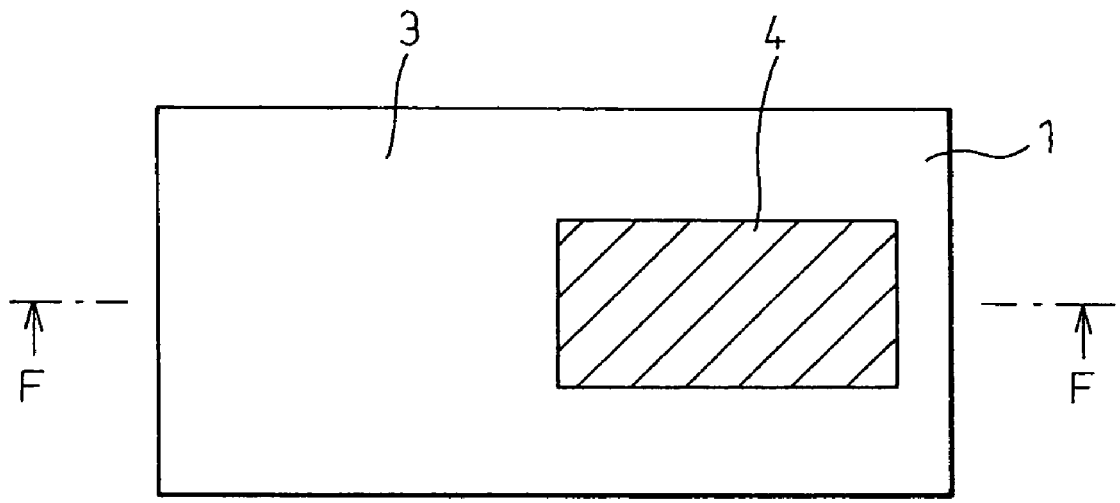
FIGS. 8A and 8B are a top plan view and a cross-sectional view of a decorative casing according to a sixth embodiment.
Figure 8B:
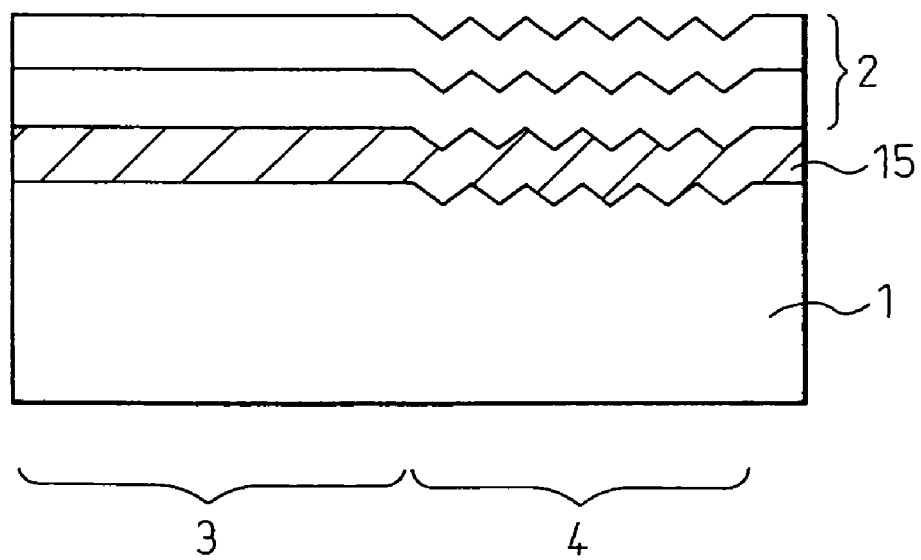

FIG. 8A is a top plan view of the decorative casing having the base material 1 on which the first region 3 of a smooth surface and the second region 4 of an uneven surface are provided. FIG. 8B is a cross-sectional view of the decorative casing shown in FIG. 8A cut along a line F-F. As shown in FIG. 8B, an adhesive layer 15 is provided between the base material 1 and the multilayer film 2. A polyester resin film having a thickness of about ten micrometers can be used for the adhesive layer.

By providing the adhesive layer 15, adhesiveness between the multilayer film 2 and the base material 1 can be increased, thereby preventing the multilayer film 2 from being peeled away from base material 1. Adhesive layer 15 itself can be colored, or a colored layer can be provided on or beneath adhesive layer 15.

Seventh Embodiment

In the seventh embodiment, an uneven surface is provided on a part of the surface of the multilayer film, without providing an uneven surface in the base material itself.

Figure 9A:
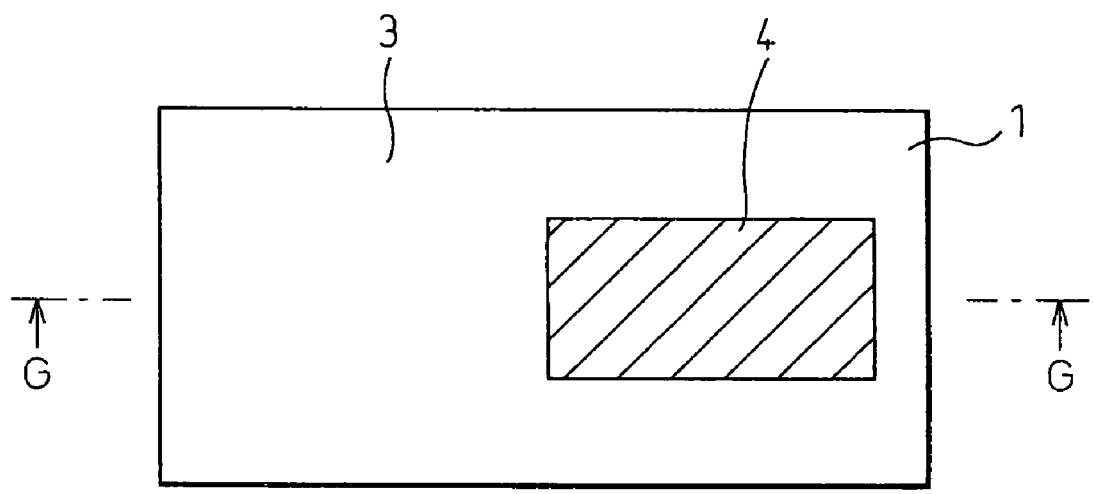
FIGS. 9A and 9B are a top plan view and a cross-sectional view of a decorative casing according to a seventh embodiment.
Figure 9B:
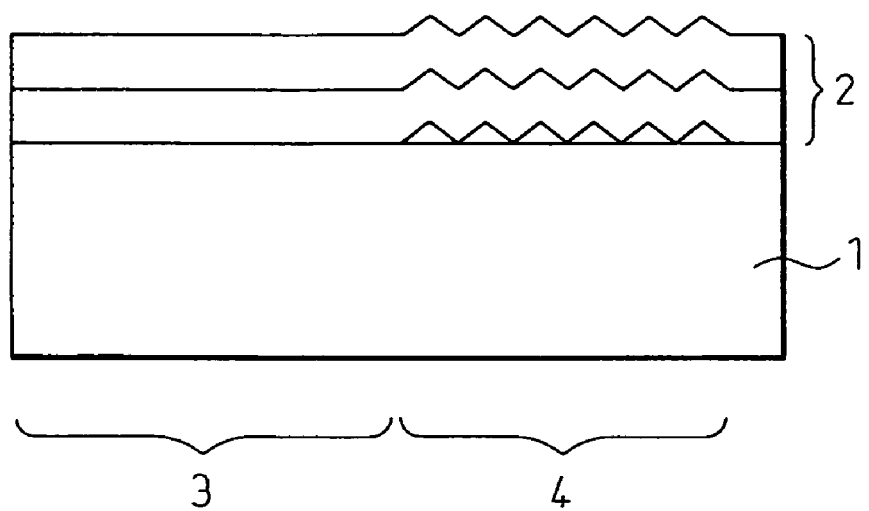

FIG. 9A is a top plan view of the decorative casing having the base material 1 on which the first region 3 of a smooth surface and the second region 4 of an uneven surface are provided. FIG. 9B is a cross-sectional view of the decoration casing shown in FIG. 9A cut along line G-G.

As shown in FIG. 9B, in the present embodiment, the surface of the base material 1 of the second region 4 for generating a diffuse reflection is made smooth, and an uneven surface is provided in the multilayer film 2. Because uneven surfaces are provided on both the upper surface and the bottom surface of the multilayer film 2, an effective incident angle of light in the second region 4 is different from that in the first region 3. Therefore, the second region 4 presents a color tone different from that of the first region 3.

According to the present embodiment, it is not necessary to provide an uneven surface in the base material itself. When the base material is made of a very hard material, this is very effective when it is difficult to form the uneven surface on the base material. Among plural thin films constituting the multilayer film, the layer on which the uneven surface is provided can be a thin film on the upper surface of the multilayer film, or a thin film on the bottom surface of the multilayer film, that is, a thin film near the interface between the multilayer film and the base material. Alternatively, the uneven surface can be provided on both the upper surface and the bottom surface of the multilayer film, as shown in FIG. 9B. In other words, when a diffuse reflection is generated based on the provision of an uneven surface on the multilayer film, the uneven surface may be formed on any layer. When the area of the second region 4 is smaller than the area of the first region 3, and also when there is no risk of peeling off of the film, an air layer can be provided between the base material 1 and the multilayer film 2. An adhesive agent can be filled between the base material 1 and the multilayer film 2 to increase adhesive strength.

Eighth Embodiment

Manufacturing methods according to the present invention are described in the eighth embodiment to the eighteenth embodiment. The eighth embodiment relates to a manufacturing method of an uneven surface on the decorative casing by embossing. The present embodiment can be applied to the decorative casings described in the first to the seventh embodiments.

Figure 10A:
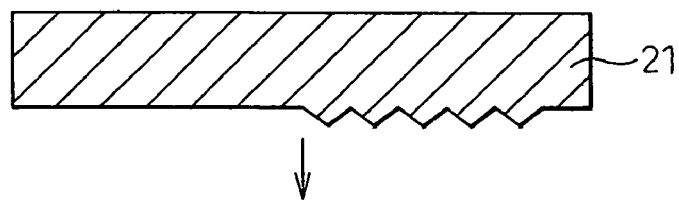
FIGS. 10A to 10D are process schematic views of a method of manufacturing a decorative casing according to an eighth embodiment.
Figure 10B:
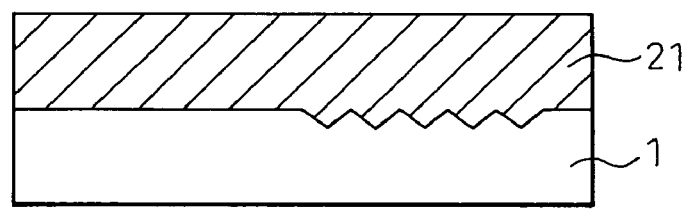
Figure 10C:
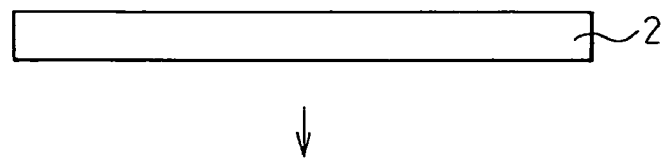

FIGS. 10A to 10D are process schematic views of the manufacturing method according to the present embodiment. First, as shown in FIG. 10A, a mold 21 for embossing is prepared on the upper surface of the base material 1 on which an uneven surface is to be provided. Next, as shown in FIG. 10B, the mold 21 is closely contacted to the base material 1, and is pressed while heating during a predetermined time. When mold 21 is removed after cooling, an uneven surface is formed in a desired region, thereby obtaining the first region 3 where the uneven surface is not formed, and the second region 4 where the uneven surface is provided, as shown in FIG. 10C.

Figure 10D:
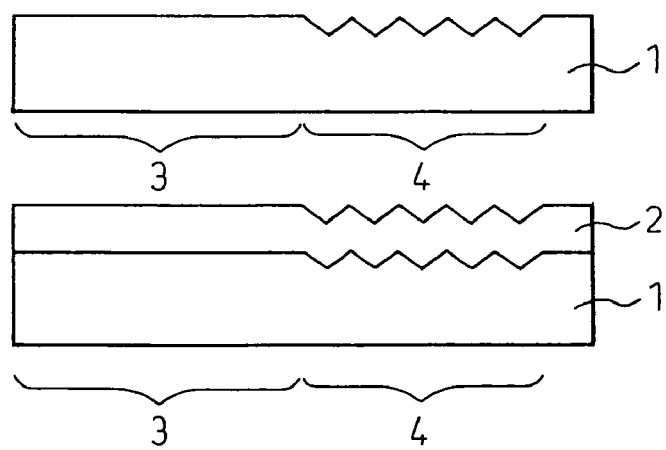

Next, as shown in FIG. 10D, the multilayer film 2 is closely contacted to the upper surface of the base material 1 on which the first region 3 and the second region 4 are formed. By applying a pressure to the multilayer film 2 while heating the multilayer film 2 during a predetermined time, the multilayer film 2 is adhered to the base material 1. While the multilayer film 2 has one layer in FIGS. 10A to 10D to facilitate the understanding of the content of the present invention, multilayer film 2 actually includes plural layers. As explained above, a desired uneven pattern can be easily obtained, by using an embossing mold. Therefore, the decorative casing of the present invention can be manufactured easily.

Ninth Embodiment

The ninth embodiment is common to the eighth embodiment in that an uneven surface is formed by embossing. However, in the ninth embodiment, embossing is not directly performed on the base material, but is performed after the multilayer film is adhered to the base material. The present embodiment can be applied to the above decorative casings of the first to the seventh embodiments.

FIGS. 11A to 11D are process schematic views of the manufacturing method according to the ninth embodiment. First, the multilayer film 2 is adhered to the base material, as shown in FIG. 11A. Next, an embossing mold 21 having an uneven surface is prepared in a desired region, and is faced on the surface of the multilayer film 2, as shown in FIG. 11B. Next, the embossing mold 21 is closely contacted to the surface of the multilayer film, and is pressed while heating, during a predetermined time, as shown in FIG. 11C. Finally, the embossing mold 21 is removed after cooling, as shown in FIG. 11D.

In the above process, second region 4 for generating a diffuse reflection can be additionally formed, even after the multilayer film 2 is adhered to the base material 1. Alternatively, the multilayer film 2 is adhered to the base material 1 after forming an uneven surface on the base material 1 in advance, and thereafter, the multilayer film 2 is embossed to form the second region 4 for generating a diffuse reflection. Based on the above combinations, a pattern common to plural products is formed by first embossing the multilayer film, before the multilayer film is adhered to the base material, as shown in the first embodiment. Thereafter, a different pattern is formed on the multilayer film for each product. In this way, the decorative casing can be individually formed, like in the present embodiment. It is also possible to combine uneven patterns exhibiting different color tones.

Tenth Embodiment

In the tenth embodiment, a laser beam or the like is used for forming an uneven surface. The present embodiment can be applied to the above decorative casings of the first to the seventh embodiments.

Figure 1:
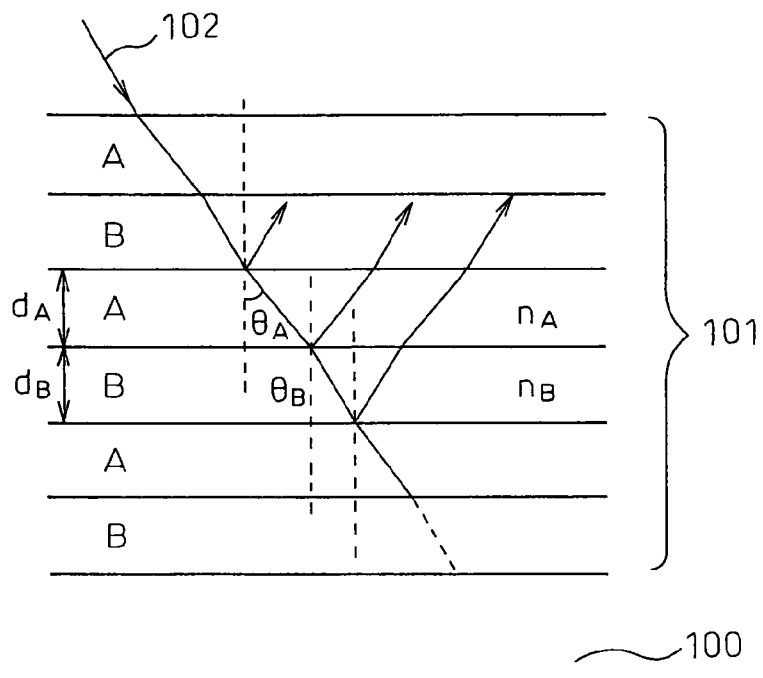
FIG. 1 is a cross-sectional view of a decorative casing explaining the principle of generating interference colors.
Figure 2A:
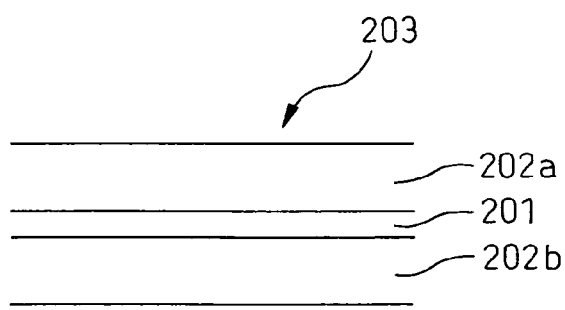
FIGS. 2A and 2B are cross-sectional views of a decorative material according to a conventional technique.
Figure 2B:
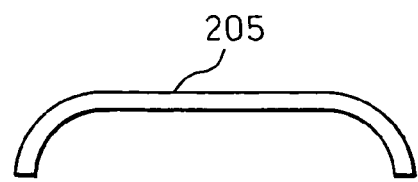
Figure 12A:
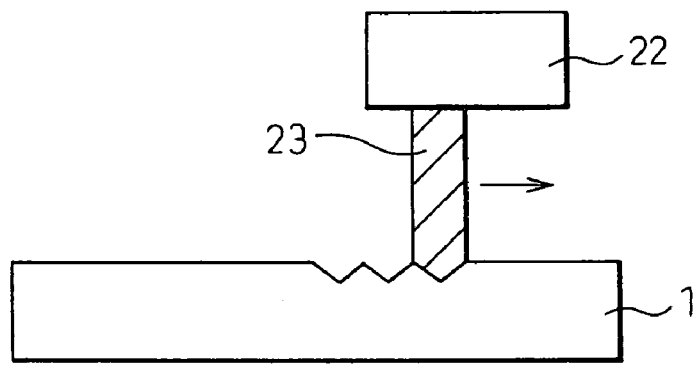
FIGS. 12A to 12D are process schematic views of a method of manufacturing a decorative casing according to a tenth embodiment.
Figure 12B:
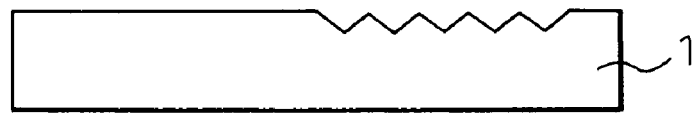

The process schematic views of the present embodiment are described with reference to FIGS. 12A to 12D. First, a laser beam 23 emitted from a laser beam source 22 is irradiated while scanning a region (the second region) on which an uneven surface is to be formed on the base material 1, as shown in FIG. 2A. As a result, an uneven surface is formed at the region irradiated with the laser beam 23, as shown in FIG. 12B.

Figure 12C:
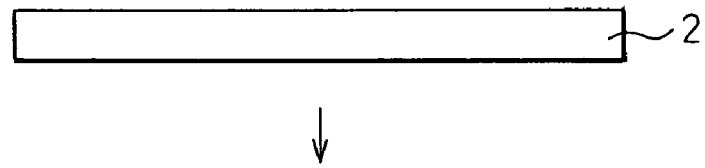
Figure 12D:
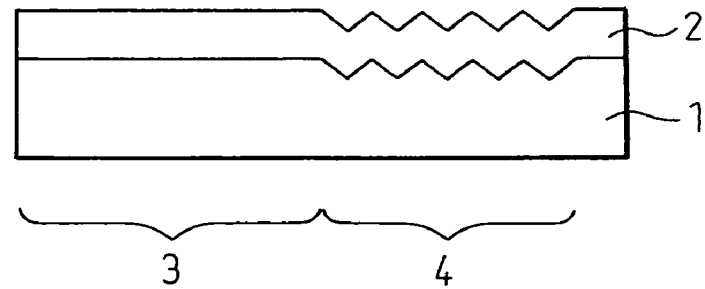

Next, the multilayer film 2 is prepared on the surface of the base material 1, and both the base material 1 and the multilayer film 2 are adhered to each other by thermal compression or by adhesion using an adhesive agent, as shown in FIG. 12C. As a result, the first region 3 exhibiting interference colors on a smooth surface, and the second region 4 generating a diffuse reflection on the formed uneven surface are obtained, as shown in FIG. 12D.

According to this method, it is not necessary to prepare the embossing mold in advance, and an uneven surface can be formed individually and quickly. A fine pattern that cannot be achieved by the mold can be formed. Various kinds of lasers can be selected according to materials, such as a YAG laser, excimer laser, etc. While an uneven surface is formed by scanning a laser beam in the present embodiment, the uneven surface can also be formed by batch exposure using a mask. In this case, the exposure process is completed in a short period of time, and high throughput of the product can be improved.

Eleventh Embodiment

In the eleventh embodiment, the multilayer film is processed in a desired shape, before the multilayer film is adhered to the base material. The present embodiment can be applied to the above decorative casings of the first to the seventh embodiments.

Figure 13A:
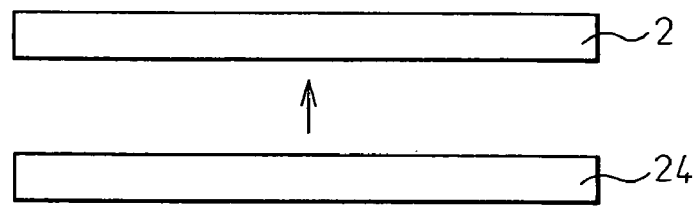
FIGS. 13A to 13E are process schematic views of a method of manufacturing a decorative casing according to an eleventh embodiment.

FIGS. 13A to 11E are schematic views of a series of steps of processing the multilayer film using a Victoria die as a processing tool. The Victoria die is a punching tool having a steel blade embedded in a resin sheet or the like of a base, with a blade curved in the same shape as that of a groove formed by laser. Because the Victoria die can be provided at low cost in a short amount of time compared with the mold, it is widely used in the field of sheet punching.

Figure 13B:
Figure 13C:
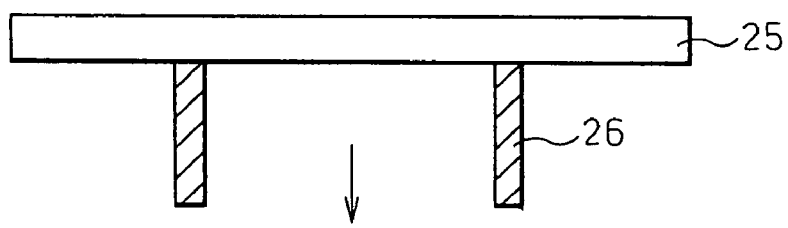

First, a polyester resin layer 24 that forms an adhesive layer is adhered to the multilayer film 2, as shown in FIGS. 13A and 13B. Next, a Victoria die 25 is pressed against the multilayer film 2 to obtain a desired pattern by cutting the multilayer film 2 in a desired shape. Tooth 26 of the Victoria die is provided along the outer periphery of a desired shape, and has a closed loop.

Figure 13D:
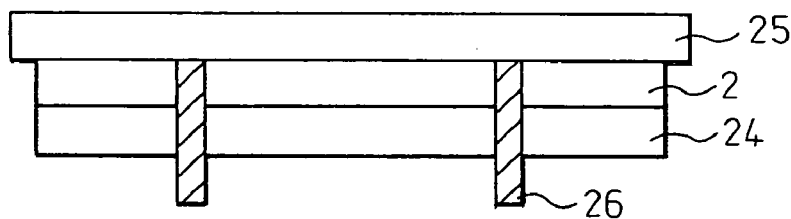
Figure 13E:
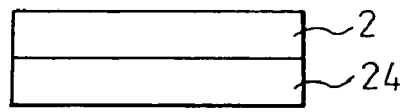

The Victoria die once pressed into the multilayer film 2 is pulled up, and a surplus part is removed, as shown in FIG. 13D. Then, the multilayer film 1 of a desired shape is obtained, as shown in FIG. 13E. When this multilayer film 2 is adhered to the base material 1 on a part of the surface of which the uneven surface is provided, the decorative casing according to the present invention is obtained.

Because the Victoria die can be manufactured relatively easily, the use of the Victoria die has an advantage in that the multilayer film having a desired shape can be obtained in a short period of time, as compared with the use of the punching mold.

Twelfth Embodiment

In the twelfth embodiment, the base material is formed by injection molding. The present embodiment can be applied to the above decorative casings of the first to the sixth embodiments.

Figure 14A:
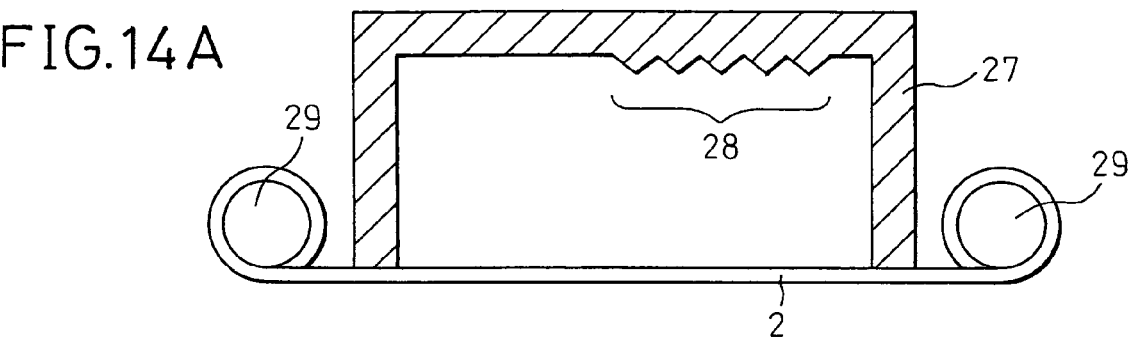
FIGS. 14A to 14D are process schematic views of a method of manufacturing a decorative casing according to a twelfth embodiment.

FIGS. 14A to 14D are schematic views of a series of steps of the manufacturing method according to the injection molding. First, an external mold 27 is prepared, as shown in FIG. 14A. An asperity 28 is formed at the time of manufacturing the mold by electric discharge machining, for example, in a region where the uneven surface of the casing is to be formed, on the internal surface of the concave part of the mold 27. This uneven surface is also called a "satin finished surface" in general. The multilayer film 2 is provided to cover the mold 27 in a state that the multilayer film 2 is wound around rollers 29.

Figure 14B:
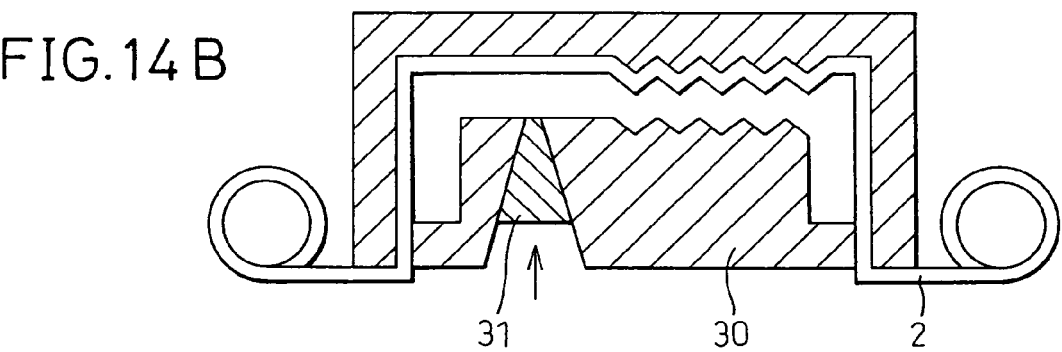

Next, an internal mold 30 is built in the mold 27, as shown in FIG. 14B. At this time, the multilayer film 2 is pulled out from the roller 29, and is provided on the internal wall of the mold 27. An asperity is also formed on the mold 30, at a position corresponding to the asperity 28 formed on the mold 27. A space in which the base material is to be injection molded is formed between the internal mold 30 and the external mold 27. Mold 30 is formed with a hole through which a resin is injected into this space, and the mold 30 is provided with a resin storage 31 connected to this hole.

Figure 14C:
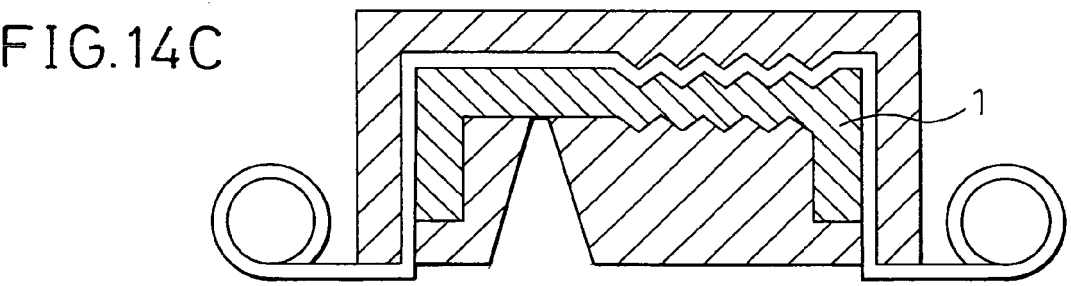
Figure 14D:
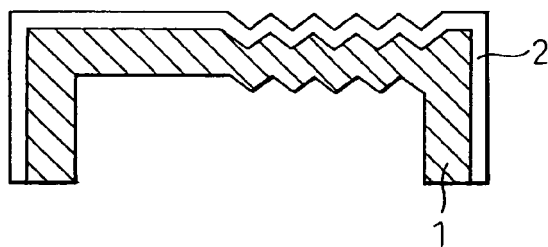

Next, a heated thermoplastic resin stored in the resin storage 31 is injected with high pressure to the space formed between the mold 27 and the mold 30, thereby forming the base material 1, as shown in FIG. 14C. Base material 1 is then formed along the shape of the mold, and the uneven surface is formed on the multilayer film 2 and the base material 1.

Next, after the thermoplastic resin is cooled and solidifies, the mold is taken out. By removing the unnecessary part, base material 1 having multilayer film 2 provided at a predetermined position is obtained.

In the present embodiment, while discharge processing is described as a method of forming a satin finished surface, it is also possible to use grain a finishing method, blasting method, and laser processing method. While the embodiment that the multilayer film is pulled out from the roller, and provided in the concave part of the mold is shown, the mold can be provided within the concave part of the mold after the multilayer film is formed in a predetermined shape beforehand.

Based on this manufacturing method, formation of the base material having an uneven surface on a part of the surface and adhesion of the multilayer film can be performed at one time, thereby reducing the process time.

Thirteenth Embodiment

In the thirteenth embodiment, a nanoimprint technique is used as a method of forming an asperity having a fine pattern. The present embodiment can be applied to the above decorative casings of the first to the seventh embodiments.

Figure 15A:
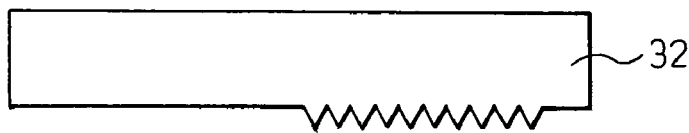
FIGS. 15A to 15D are process schematic views of a method of manufacturing a decorative casing according to a thirteenth embodiment.

First, as shown in FIG. 15A, a nanostamper 32 made of a nickel mold having an asperity formed at a desired position is prepared. The nanostamper 32 is faced against the surface of the base material 1 made of polycarbonate as a thermoplastic resin on which the uneven surface is to be formed. The base material 1 is softened at a higher temperature than the glass transition temperature, in accordance with the characteristics of the resin. For example, polycarbonate as a resin can be softened by heating this resin up to 120 degrees centigrade which is higher than the glass transition temperature by 10 to 20 degrees centigrade.

Figure 15B:
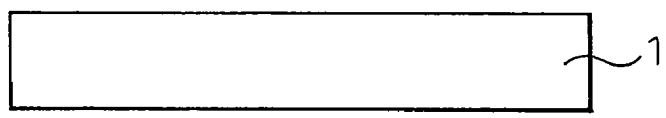

As shown in FIG. 15B, polycarbonate is inserted into the asperity of the nanostamper, by closely adhering and thermally pressing the base material 1 to the nanostamper 32.

Figure 15C:
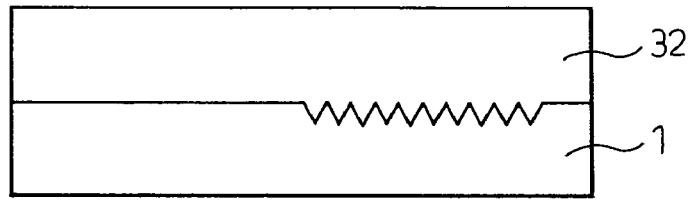
Figure 15D:
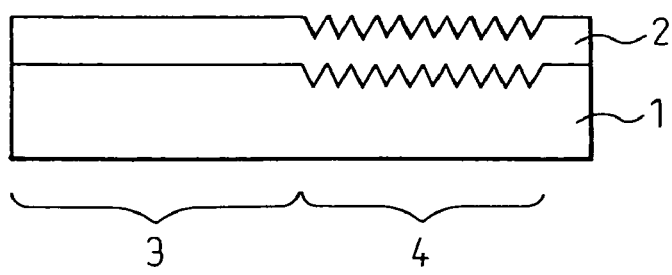

Next, after these are cooled to a temperature below the glass transition temperature, the nanostamper 32 is detached from the base material 1, as shown in FIG. 15C. As a result, the inverse pattern of the asperity of the nanostamper 32 is transferred to the base material 1. Next, as shown in FIG. 15D, the multilayer film 2 is adhered to the base material 1, thereby forming the smooth first region 3 exhibiting interference colors, and the second region 4 formed with the uneven surface for generating a diffuse reflection. By using the nanostamper, high-precision processing and high throughput can be achieved. While nickel is used as the material of the nanostamper, the material of the nanostamper is not limited to this.

Fourteenth Embodiment

In the fourteenth embodiment, the adhesive agent used for the multilayer film adhered to the base material is dissolved in an organic solvent, and the dissolved adhesive agent is coated to the multilayer film. The present embodiment can be applied to the above decorative casing of the sixth embodiment.

Figure 16A:
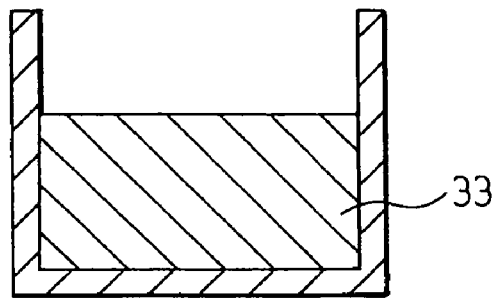
FIGS. 16A to 16C are process schematic views of a method of manufacturing a decorative casing according to a fourteenth embodiment.
Figure 16B:
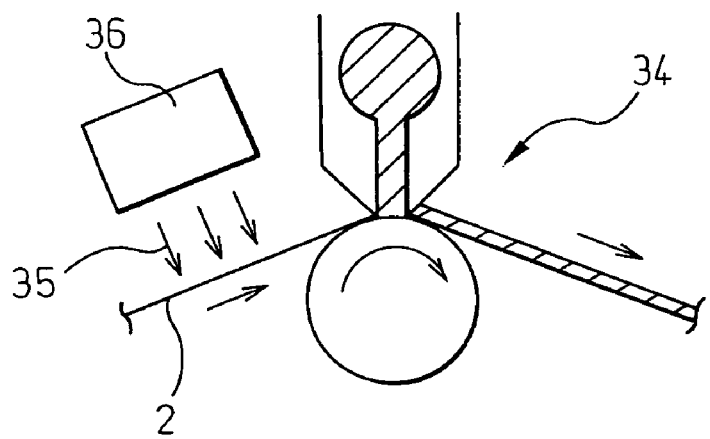
Figure 16C:
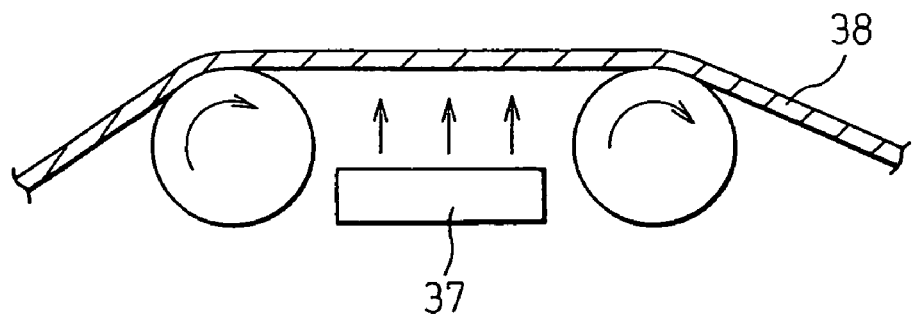

FIGS. 16A to 16C are process schematic views of a method of manufacturing a polyester resin layer that in order to adhere the multilayer film to the base material. First, as shown in FIG. 16A, the polyester resin is dissolved in the organic solvent to obtain a resin liquid 33. Next, a die coater 34 is used to coat the resin liquid 33 onto the surface of the multilayer film 2, while feeding the multilayer film 2 to the right direction in FIG. 16B with a roll. Before the resin liquid 33 is coated, surface modification can be performed to improve the wettability of the multilayer film and the resin liquid 33. The surface modification can be performed by irradiating an excimer UV ray 35 from a light source 36, for example. Next, as shown in FIG. 16C, the multilayer film 2 is heated with a heater 37 to evaporate the organic agent, thereby forming a polyester resin layer 38. Thereafter, the polyester resin layer 38 is formed in a predetermined shape, and the polyester resin layer 38 is adhered to the base material.

While the die coater is used in the present embodiment, a bar coater can be also used, and various kinds of printing techniques can be used. As a method of performing the surface modification before coating the organic solvent to the multilayer film, corona treatment or flame treatment can be also performed. Based on the present invention, a polyester resin layer having a uniform film thickness and favorable film quality without any voids can be easily obtained. By performing surface modification, a decorative casing with excellent adhesiveness can be obtained.

Fifteenth Embodiment

In the fifteenth embodiment, a polyester resin and an additive are added to the organic solvent in a manufacturing method similar to that of the fourteenth embodiment. The present embodiment can be applied to the above decorative casing of the sixth embodiment.

In the present embodiment, the additive is added to the organic solvent, in dissolving the polyester resin in the organic solvent, in FIG. 16A. The die coater 34 is used to coat the resin liquid 33 onto the multilayer film 2, as shown in FIG. 16B. As shown in FIG. 16C, the multilayer film 2 coated with the resin liquid 33 is heated with the heater 37, thereby obtaining a polyester resin layer.

Polyisocyanate or an additive for plastics can be used for the additive. By adding the additive, the adhesive force between the multilayer film and the base material can be increased.

After the polyester resin and the additive are added to the organic solvent, this mixture can be agitated in a liquid state. By adding this agitating step, the additive and the polyester resin are uniformly distributed. The agitated result is coated onto the multilayer film, and the organic solvent is evaporated, thereby obtaining a polyester resin layer having the additive uniformly distributed. As a result, the multilayer film having uniform adhesive strength between the multilayer film and the base material can be obtained.

Sixteenth Embodiment

In the sixteenth embodiment, a colored layer is provided on one surface of the multilayer film. The present embodiment can be applied to the above decorative casing of the fourth embodiment.

Figure 17A:
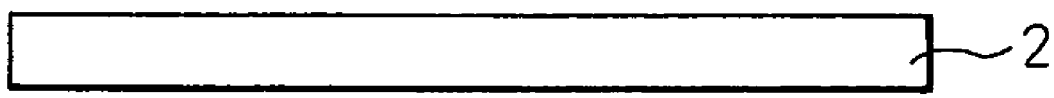
FIGS. 17A to 17C are process schematic views of a method of manufacturing a decorative casing according to a sixteenth embodiment.
Figure 17B:
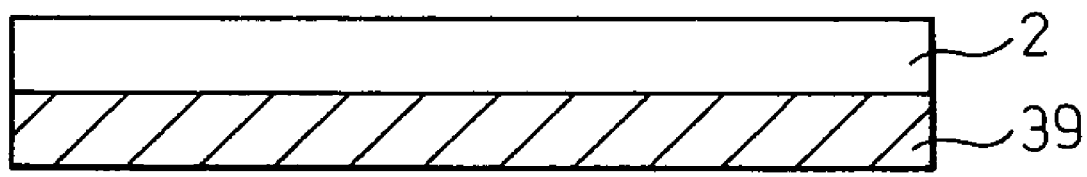
Figure 17C:
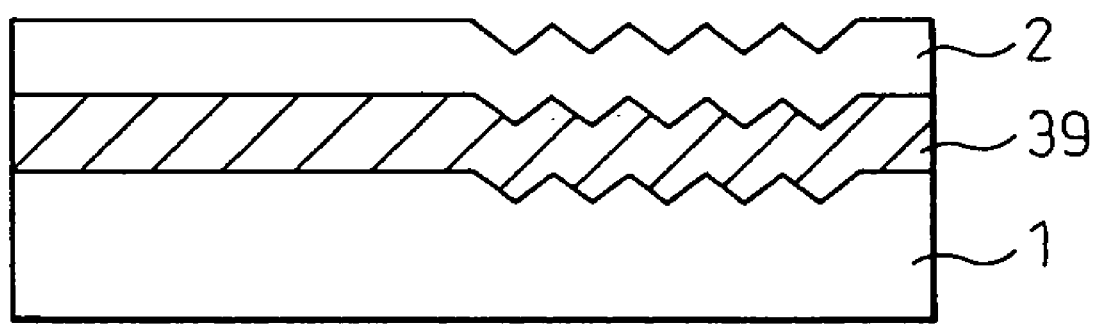

FIGS. 17A to 17C are process schematic views of the manufacturing method according to the present embodiment. First, the multilayer film 2 is prepared, as shown in FIG. 17A. A pigment layer is coated onto one surface of the multilayer film (the surface which does not become the external side after the multilayer film is adhered to the base material), thereby forming a colored layer 39, as shown in FIG. 17B. Dyes can also be used, in place of this pigment.

Next, the multilayer film 2 is adhered to the surface of the base material 1 on a part of which the uneven surface is provided, as shown in FIG. 17C. The colored layer 39 is adhered to between the multilayer film 2 and the base material 1.

A color different from that of the base material can be expressed, based on the above configuration. A color obtained by combining the color of the colored layer with the interference color, and a color obtained from a diffuse reflection in the region having the uneven surface provided on the color layer can be expressed, thereby further enhancing decoration. The colored layer can also be provided in a desired region, instead of on the whole surface of base material 1.

Seventeenth Embodiment

In the seventeenth embodiment, a product name and the like are provided on the multilayer film by printing. The present embodiment can be applied to the above decorative casings of the first to the seventh embodiments.

Figure 18A:
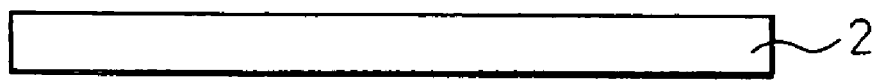
FIGS. 18A to 18D are process schematic views of a method of manufacturing a decorative casing according to a seventeenth embodiment.
Figure 18B:
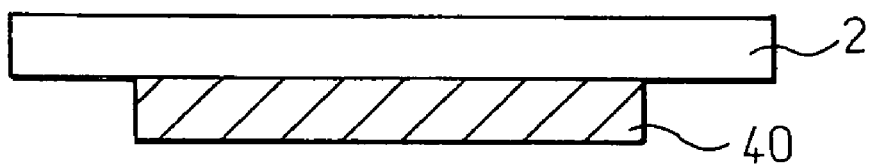

FIGS. 18A to 18D are process schematic views of the manufacturing method according to the present embodiment. First, the multilayer film 2 is prepared, as shown in FIG. 18A. A product name, a company name, or a corporate logo or the like are printed onto one surface of the multilayer film 2 (the surface which does not become the external side after the multilayer film 2 is adhered to the base material) using a pigment layer 40, as shown in FIG. 18B. Dye stuff can also be used, in place of this pigment.

Figure 18C:
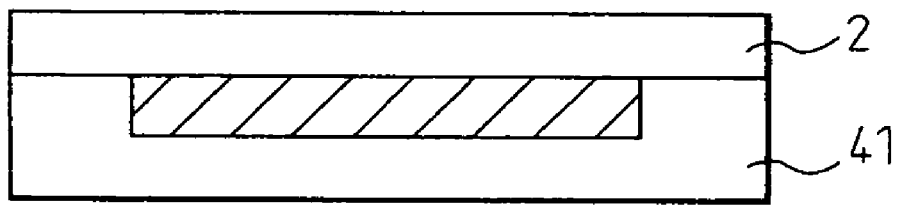
Figure 18D:
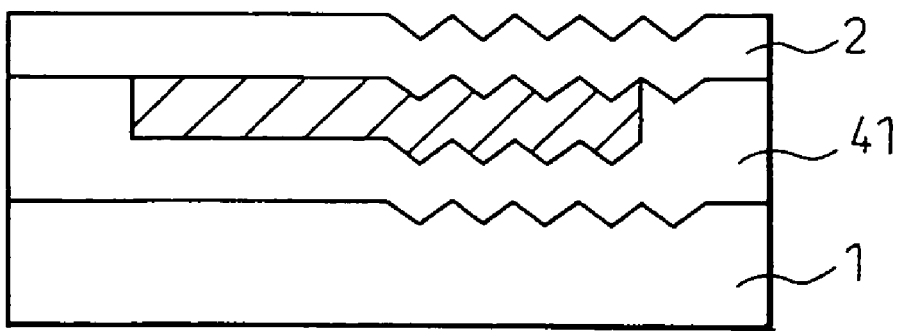

A polyester resin layer 41 to be used as an adhesive agent is adhered, as shown in FIG. 18C. Next, the multilayer film 2 is adhered to the base material 1 made of a thermoplastic resin having an uneven surface provided on a part of the surface, with the rest of the surface kept smooth.

Based on the above configuration, a decoration technique of expressing a depth feeling in a product name and the like can be achieved. A product name and the like can be expressed by combining the coloring using a pigment with the interference color using the multilayer film. A product name and the like can be also expressed by combining the coloring of a pigment or the like with the color tone obtained from a diffuse reflection from the uneven surface, thereby enhancing decoration based on various expressing methods of the color.

Eighteenth Embodiment

The eighteenth embodiment is similar to the seventeenth embodiment in that a product name and the like are provided in a similar manner, but is different from the seventeenth embodiment in that a product name and the like are provided on the surface of the base material. The present invention can be applied to the above decorative casings of the first to the seventh embodiments.

Figure 19A:
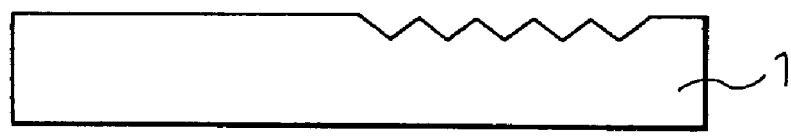
FIGS. 19A to 19D are process schematic views of a method of manufacturing a decorative casing according to a eighteenth embodiment.
Figure 19B:
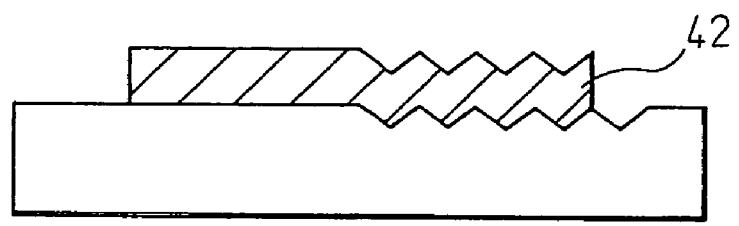

FIGS. 19A to 19D are process schematic views of the manufacturing method according to the present embodiment. First, the base material 1 made of a thermoplastic resin having an uneven surface provided on a part of the surface, with the rest of the surface kept smooth is prepared, as shown in FIG. 19A. Next, a product name, a company name, and a corporate logo or the like are printed on a part of the surface of the base material 1 using a pigment layer 42, as shown in FIG. 19B. Dye stuff can also be used, in place of this pigment. The print can be provided either at only one of or both the smooth surface and the uneven surface of the base material 1.

Figure 19C:
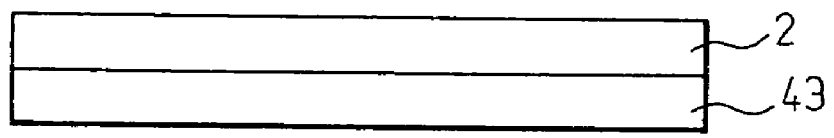
Figure 19D:
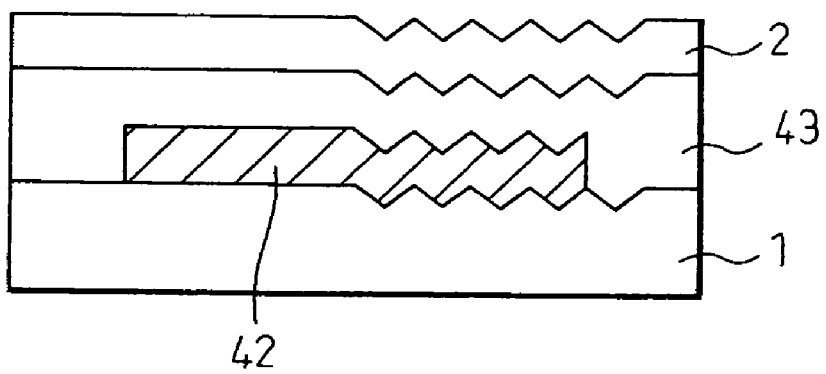

The multilayer film 2 adhered with a polyester resin layer 43 to be used for an adhesive agent is prepared, as shown in FIG. 19C. The multilayer film 2 is adhered to the base material 1 on a part of the surface of which the uneven surface is provided, as shown in FIG. 19D.

Based on the above configuration, a decoration technique of expressing a depth feeling in a product name and the like can be achieved. A product name and the like can be expressed by combining the coloring using a pigment with the interference color using the multilayer film. A product name and the like can also be expressed by combining the coloring of a pigment or the like with the color tone obtained from a diffuse reflection from the uneven surface, thereby enhancing decoration based on various expression.

Nineteenth Embodiment

The present embodiment relates to an example having the decoration of the multilayer film according to the present invention applied to a mouse of a personal computer.

Figure 20:
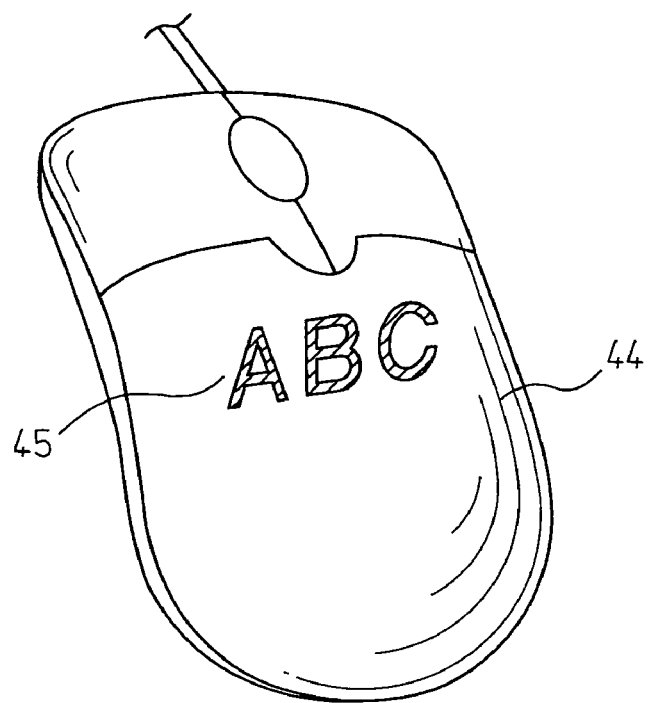
FIG. 20 is a perspective view of a mouse according to one embodiment of the present invention.

FIG. 20 is a perspective view of a mouse 44 having a multilayer film adhered to the casing made of a thermoplastic resin. The surface of the mouse is covered with a smooth region except a part of the surface. A fine uneven surface is provided on a part of the surface. A diffuse reflection region is formed by this uneven surface, and letters "ABC" 45 are expressed. A smooth region not formed with the characters 45 exhibits interference colors in the multilayer film. On the other hand, a region formed with the characters 45 generates a diffuse reflection based on the uneven surface, and has a color tone different from the interference colors of the smooth region.

By partially providing a change to the color tone, decoration can be enhanced. Further, a product name and the like can be expressed using characters. Because a product name and the like do not need to be added by printing, a manufacturing process of the product can be simplified. While a mouse is used as one example of the product in the present embodiment, a region generating a diffuse reflection on a part of the casing adhered with a film generating interference colors can be similarly performed in other electronic device such as a personal computer, thereby enhancing decoration.

Twentieth Embodiment

Figure 21:
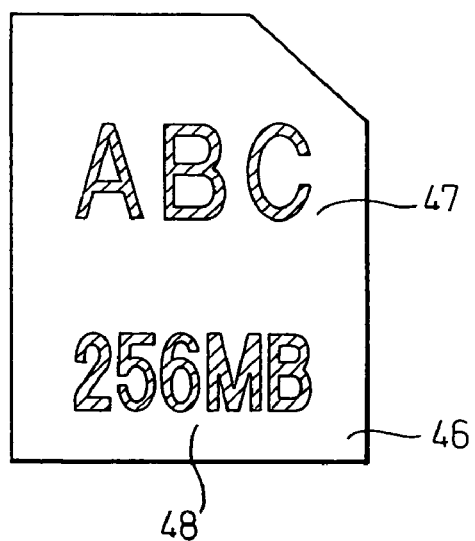
FIG. 21 is a top plan view of a memory card according to one embodiment of the present invention.

The present embodiment relates to an example having the multilayer film according to the present invention applied to a memory card. FIG. 21 is a top plan view of the memory card. As shown in FIG. 21, a colored layer is provided on a memory card body 46 made of a thermoplastic resin casing, and a multilayer film generating interference colors is formed on the colored layer. An uneven surface is provided on a part of the surface of the multilayer film, thereby forming a region generating a diffuse reflection having a color tone different from that on a smooth surface. Characters 47 are expressed using this region generating a diffuse reflection.

When the multilayer film itself is colorless, colors added to the color layer are mixed with the interference colors. As a result, various colors can be obtained. Further, based on the provision of the region generating a diffuse reflection, a region having a color tone different from that in the smooth region is formed. As a result, decoration can be enhanced. Further, a manufacturer's name and a product name can be expressed using a region generating a diffuse reflection, and the process of additionally giving a product number and the like can be omitted. The present embodiment can also be applied to a USB memory, in addition to the memory card.

Twenty First Embodiment

Figure 22:
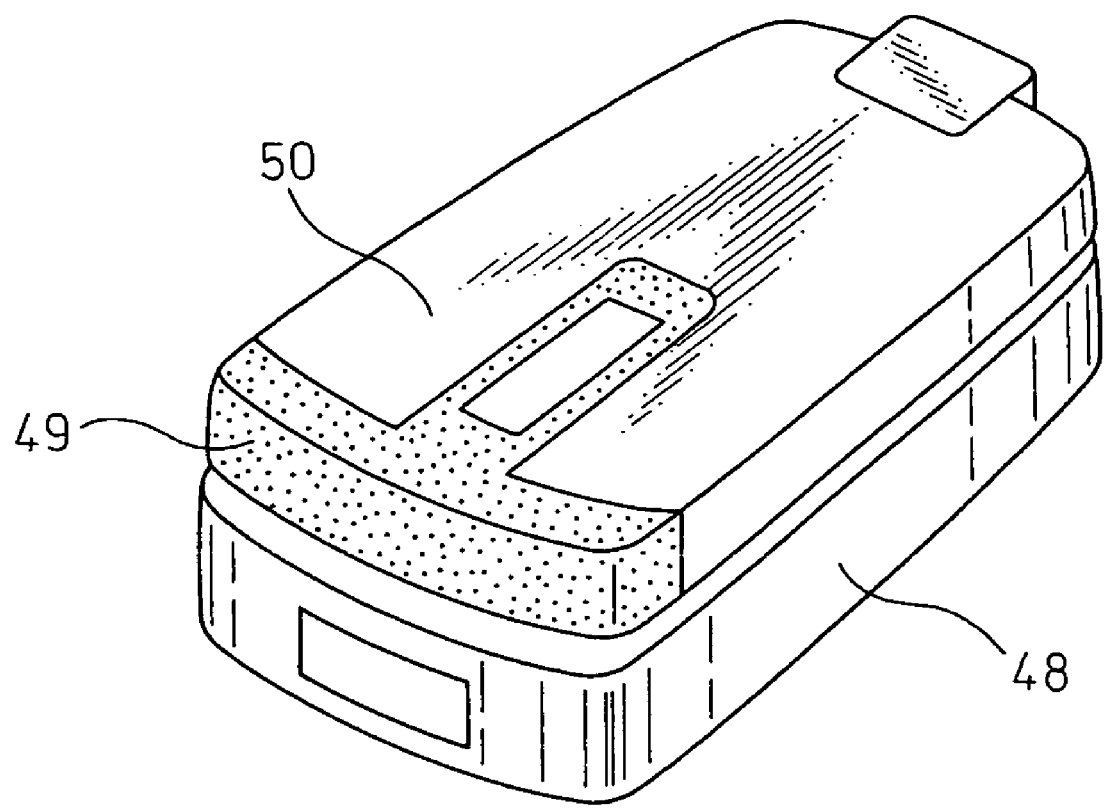
FIG. 22 is a perspective view of a mobile telephone according to one embodiment of the present invention.

The twenty first embodiment relates to the application of the multilayer film according to the present invention to a portable telephone. FIG. 22 is a perspective view of a flip phone 48 as a portable telephone. A multilayer film is adhered to the surface of the casing of the flip phone made of a thermoplastic resin on a part of which an uneven region 49 is formed. With this arrangement, interference colors are generated from the multilayer film in the smooth region on which the uneven surface is not formed, and a diffuse reflection is generated in the region provided with the uneven surface. The uneven region 49 is formed on the side surface as well as the upper plane surface at an upper part of the flip phone 48, as shown in FIG. 22.

In the present embodiment, the upper plane surface at the upper part of the flip phone is flat. As a result, even when the multilayer film generating the interference colors is adhered to the flip phone, the interference colors become constant because the reflection angle relative to the observer is steady within the flat region. Accordingly, the color tone becomes monotone. However, when the uneven region 49 is formed on a part of a flat region 50, a region having a color tone different from that in other region can be formed, thereby enhancing decoration.

A peripheral edge part between the upper part of the upper side and the side surface of the flip phone is curved. A multilayer film is formed in this region, and a region generating a diffuse reflection is formed in a part of the curved part. Based on this configuration, a smooth part of the curved part has a reflection angle different from that of the flat part, thereby generating a change in the interference colors depending on the viewing angle. On the other hand, in the diffuse reflection region of the curved part, angle dependency of color tones is smaller than that in the smooth part. Therefore, change of color tones at different viewing angles is small. Accordingly, in the curved part, contrast of color tones in the smooth part and the uneven part is emphasized, thereby exhibiting extremely excellent sharp decoration. While a portable telephone has been used as an example in the present embodiment, the present embodiment can be similarly applied to other electronic devices such as a portable music player and a mobile terminal.

In the above embodiments, a casing is used as an example in which a smooth region and a region having an uneven surface are provided. However, the effect of improving decoration can be similarly obtained by applying the present invention to a base material other than the casing, such as a carved ornament which does not incorporate an electronic device or the like.

What is claimed is:

1. A decorative casing, comprising:
    a base material having a surface that includes at least one uneven region; and
    a multilayer film having a plurality of thin films laminated together alternately of different refractive indexes from each other, which is adhered to the surface of said base material,
    wherein said multilayer film includes at least one first region and at least one second region,
    wherein each thin film of said multilayer film in said first region has only smooth surfaces and one or more of the plurality of thin films of said multilayer film in said second region have uneven surfaces that each correspond positionally to the at least one uneven region of the surface of the base material, and
    wherein said multilayer film generates interference color in said first region.

2. The decorative casing according to claim 1, further comprising an adhesive layer provided between said multilayer film and the surface of said base material.

3. The decorative casing according to claim 2, wherein said adhesive layer includes a polyester resin.

4. The decorative casing according to claim 1, further comprising a colored layer provided between said multilayer film and the surface of said base material.

5. The decorative casing according to claim 1, wherein a thickness of said multilayer film is 13 to 19 microns.

6. The decorative casing according to claim 1, wherein said base material is made of resin.

7. The decorative casing according to claim 6, wherein said resin is a thermoplastic resin.

8. An electronic device having the decorative casing according to claim 1.

9. A portable telephone having the decorative casing according to claim 1.

10. The decorative casing according to claim 1, wherein each of the plurality of thin films of said multilayer film in said second region have uneven surfaces that each correspond to the at least one uneven region of the surface of the base material.

* * * * *